US 11,386,885 B2

(12) United States Patent
Chatterjee et al.

(10) Patent No.: US 11,386,885 B2
(45) Date of Patent: Jul. 12, 2022

(54) METHOD AND SYSTEM FOR DETECTING INTENT AS AN ORDERED SEQUENCE FROM A USER QUERY

(71) Applicant: Wipro Limited, Bangalore (IN)

(72) Inventors: Arindam Chatterjee, Bangalore (IN); Pratik Kumar Pandey, Patna (IN)

(73) Assignee: Wipro Limited, Bangalore (IN)

( * ) Notice: Subject to any disclaimer, the term of this patent is extended or adjusted under 35 U.S.C. 154(b) by 294 days.

(21) Appl. No.: 16/835,415

(22) Filed: Mar. 31, 2020

(65) Prior Publication Data
US 2021/0256966 A1    Aug. 19, 2021

(30) Foreign Application Priority Data

Feb. 17, 2020  (IN) .............................. 202041006845

(51) Int. Cl.
*G10L 15/16* (2006.01)
*G06F 16/2457* (2019.01)
*G10L 15/18* (2013.01)
*G06N 3/08* (2006.01)
*G06F 16/242* (2019.01)
*G06N 3/04* (2006.01)

(52) U.S. Cl.
CPC .......... *G10L 15/16* (2013.01); *G06F 16/243* (2019.01); *G06F 16/24575* (2019.01); *G06N 3/04* (2013.01); *G06N 3/08* (2013.01); *G10L 15/1815* (2013.01)

(58) Field of Classification Search
CPC ............... G10L 15/16; G10L 15/1815; G06F 16/243; G06F 16/24575; G06N 3/04; G06N 3/08
See application file for complete search history.

(56) References Cited

U.S. PATENT DOCUMENTS

| 11,043,214 B1 * | 6/2021 | Hedayatnia ............. G10L 15/30 |
| 11,080,483 B1 * | 8/2021 | Islam ..................... G06F 40/205 |
| 11,144,721 B2 * | 10/2021 | Deshmukh ............ G06F 40/253 |

(Continued)

FOREIGN PATENT DOCUMENTS

| CN | 110287283 A | 9/2019 |
| EP | 3500946 A1 | 6/2019 |
| WO | 2018035248 A1 | 2/2018 |

*Primary Examiner* — Michael Colucci (74) *Attorney, Agent, or Firm* — Finnegan, Henderson, Farabow, Garrett & Dunner, LLP (57) ABSTRACT

Disclosed herein is method and system for detecting intent as an ordered sequence from user query. The system identifies word embedding feature for each word using word embedding model and identifies Part of Speech tag feature. Thereafter, system determines dependency label feature based on dependency role and POS tag feature. Further, system provides feature vector comprising POS tag feature of target word, POS tag feature of previous two words of target word, word embedding feature of target word, word embedding feature of head word for each target word and dependency label feature of target word to deep neural network for detecting intent as ordered sequence. The ordered sequence includes desired action in user query, focal point pertaining to which desired action must be performed and one or more descriptors associated with focal point. In this manner, in present disclosure, overall intent from user query is captured for accurately providing response.

15 Claims, 5 Drawing Sheets

(56) References Cited

U.S. PATENT DOCUMENTS

| | | | |
|---|---|---|---|
| 2018/0121799 A1* | 5/2018 | Hashimoto | G06N 3/084 |
| 2018/0174020 A1* | 6/2018 | Wu | G06N 3/0445 |
| 2018/0232443 A1* | 8/2018 | Delgo | G06F 40/295 |
| 2018/0329918 A1 | 11/2018 | Hakkani-Tur et al. | |
| 2018/0341860 A1 | 11/2018 | Shazeer et al. | |
| 2019/0130073 A1* | 5/2019 | Sun | G06N 7/005 |
| 2019/0244603 A1 | 8/2019 | Angkititrakul et al. | |
| 2020/0184307 A1* | 6/2020 | Lipka | G06N 20/00 |
| 2020/0320171 A1* | 10/2020 | Park | G06N 7/005 |

* cited by examiner

METHOD AND SYSTEM FOR DETECTING INTENT AS AN ORDERED SEQUENCE FROM A USER QUERY

TECHNICAL FIELD

The present subject matter is generally related to Natural Language Processing (NLP) and more particularly, but not exclusively, to a method and a system for detecting intent as an ordered sequence from a user query.

BACKGROUND

The natural language based intelligent systems rely on identifying key information from incoming user queries or sentences in order to provide a corresponding response. The most vital information is the user intent. The user intent in most of intent mining systems, attempt to capture the intent as a single or a contiguous sequence of text. This essentially means that not all components of the intent are necessarily captured. The user intent, if broken down to more granular form, is a combination of a desired action and a focal point pertaining to which the action needs to be performed. This desired action is an entity, which, in most cognitive systems is not mined. Mining only the focal point in the user intent and not heeding the action pertaining to it might result in unwanted results. The desired action determines what the user intends to do. If the desired action is not extracted accurately, it can lead to a different mined intent, than what the user originally desired.

In addition, it has been observed in numerous cases, that there is certain added information provided by users, which help in further deciphering the true intent expressed by a user. Capturing these added features become equally important in understanding complete intent. Further, all the individual parts of the user intent need to be captured accurately to extract the user intent in a user utterance as a whole. Furthermore, each sub part of the intent is interrelated or, dependent on each other. Therefore, these dependencies need to be captured as well, for the individual components of the user intent to make sense. The existing mechanisms does not accurately extract the user intent from the natural language user query and does not extract the user intent as a natural language text sequence and hence the response provided may not be relevant to the user query or the sentence.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for detecting intent as an ordered sequence from a user query. The method comprises identifying a word embedding feature for each word in a user query using a word embedding model. The method comprises identifying a Part of Speech (POS) tag feature for each word in the user query. The method also comprises determining a dependency label feature for each word in the user query based on dependency role of each word in the context of the user query and POS tag feature of each word in the user query. Thereafter, the method comprises providing a feature vector for the user query comprising the POS tag feature of each target word, POS tag feature of previous two words of each target word in the user query, word embedding feature of each target word in the user query, word embedding feature of a head word for each of the target word and the dependency label feature of the target word to a deep neural network, wherein the head word for each of the target word is determined using the dependency label feature of each word. Upon providing the feature vector to the deep neural network, the method comprises detecting the intent as an ordered sequence, based on the feature vector using the deep neural network. Further, the method comprises detecting the intent as an ordered sequence comprising a desired action in the user query, a focal point pertaining to which the desired action has to be performed and one or more descriptors associated with the focal point in the user query.

Further, the present disclosure discloses a system for detecting intent as an ordered sequence from a user query. The intent detection system comprises a processor and a memory communicatively coupled to the processor. The memory stores the processor-executable instructions, which, on execution, causes the processor to identify a word embedding feature for each word in a user query using a word embedding model. The processor identifies a Part of Speech (POS) tag feature for each word in the user query and determines a dependency label feature for each word in the user query based on dependency role of each word in the user query and POS tag feature of each word in the user query. Thereafter, the processor provides a feature vector for the user query comprising the POS tag feature of each target word, POS tag feature of previous two words of each target word in the user query, word embedding feature of each target word in the user query, word embedding feature of a head word for each of the target word in the user query and the dependency label feature of the target word to a deep neural network, wherein the head word for each of the target word is determined using the dependency label feature of each word in the user query. Using the deep neural network, the processor detects the intent as an ordered sequence, based on the feature vector wherein the ordered sequence comprises a desired action in the user query, a focal point pertaining to which the desired action has to be performed and one or more descriptors associated with the focal point in the user query.

Furthermore, the present disclosure comprises a non-transitory computer readable medium including instructions stored thereon that when processed by at least one processor causes the processor to detect intent as an ordered sequence from a user query. Further, the instructions cause the processor to identify a word embedding feature for each word in a user query using a word embedding model. Furthermore, the instructions cause the processor to identify a Part of Speech (POS) tag feature for each word in the user query. Further, the instructions cause the processor to determine a dependency label feature for each word in the user query based on dependency role of each word in the context of the user query and POS tag feature of each word in the user query. Thereafter, the instructions causes the processor to provide a feature vector for the user query comprising the POS tag feature of each target word, POS tag feature of previous two words of each target word in the user query, word embedding feature of each target word in the user query, word embedding feature of a head word for each of the target word in the user query and the dependency label feature of the target word to a deep neural network, wherein the head word for each of the target word is determined using the dependency label feature of each word in the user query. Finally, the instructions cause the processor to detect the intent as an ordered sequence, based on the feature vector using a deep neural network, comprising a desired action in the user query, a focal point pertaining to which the desired action has to be performed and one or more descriptors associated with the focal point in the user query.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the specific forms disclosed, but on the contrary, the disclosure is to cover all modifications, equivalents, and alternative falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and an intent detection system [also referred as system] for detecting intent as an ordered sequence from a user query. At first, the system may receive a user query from which the intent has to be detected. For this purpose, the system may identify a word embedding feature for each word in the user query using a word embedding model. The word embedding feature indicates semantic and syntactic significance of each word in the user query. The word embedding model may be trained using semantic and syntactic significance of one or more words from one or more historic user queries. The system also identifies a Part of Speech (POS) tag feature for each word in the user query. Thereafter, the system determines a dependency label feature for each word in the user query. The dependency label feature is based on dependency role of each word in the user query and POS tag feature of each word in the user query. The dependency label feature indicates role of each word in context of the user query. Further, the system provides a feature vector comprising POS tag feature of each target word, POS tag feature of previous two words of each target word in the user query, word embedding feature of each target word in the user query, word embedding feature of a head word for each of the target word and the dependency label feature of the target word to a deep neural network. The deep neural network is trained to generate the intent as an ordered sequence based on the feature vector generated from the user query and observed in one or more historic user queries. The system detects the intent as an ordered sequence based on the feature vector using the deep neural network. The ordered sequence may include a desired action in the user query, a focal point pertaining to which the desired action must be performed, and one or more descriptors associated with the focal point in the user query. In this manner, the present disclosure provides a mechanism for detecting intent in an ordered sequence which considers all the parameters such as focal point, descriptors and desired action for detecting the true and complete intent from the user query. In the present disclosure, overall intent from the user query is captured. Besides, finding the intent as a sequence of essential components of the intent the present disclosure also identifies the interdependency among the components and what each component indicates in the context of the user query.

Figure 1:
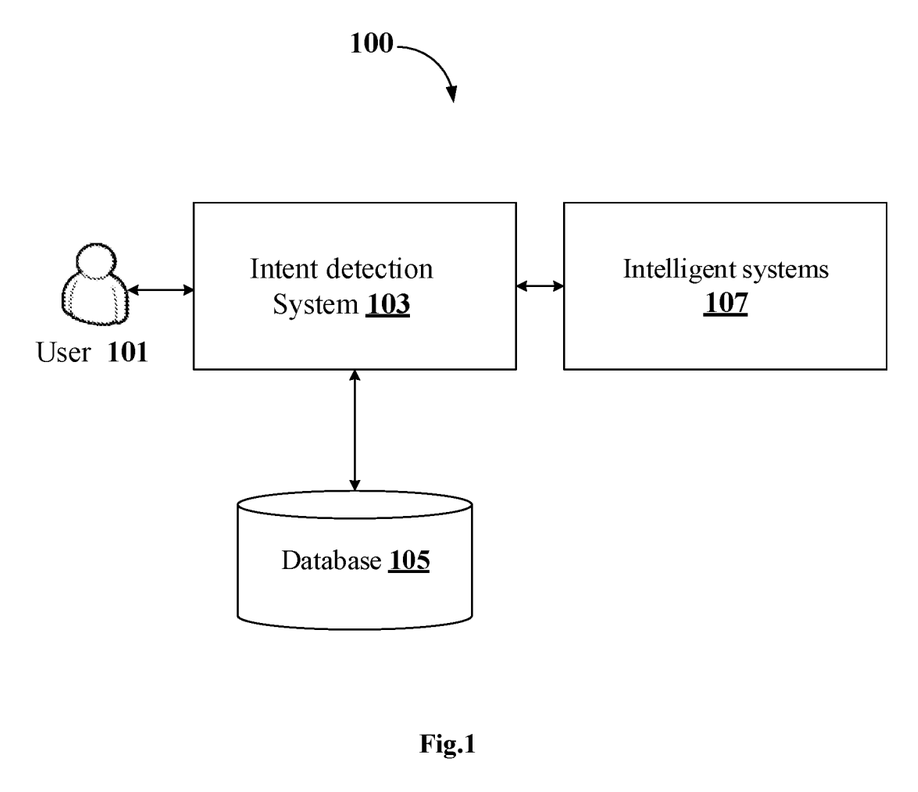
FIG. 1 shows an exemplary architecture for detecting intent as an ordered sequence from a user query in accordance with some embodiments of the present disclosure.

FIG. 1 shows an exemplary architecture for detecting intent as an ordered sequence from a user query in accordance with some embodiments of the present disclosure.

The architecture 100 may include an intent detection system 103 [also referred as system], a database 105 associated with the intent detection system 103 for storing the user query and its associated intent being extracted and an intelligent system 107. The intent detection system 103 may receive a user query or an utterance from a user 101. The user query or the utterance may be provided in order to perform a function. As an example, the user query may be "Please cancel my flight ticket from Chennai to Kolkata". Upon receiving the user query, the intent detection system 103 may detect the intent as an ordered sequence. As an example, the ordered sequence may be a desired action to be performed in the user query, a focal point pertaining to which the desired action must be performed, and one or more descriptors associated with the focal point. In order to identify the ordered sequence, the intent detection system 103 may first identify a word embedding feature for each word in the user query. In an embodiment, the word embedding feature may be identified using a word embedding model. The word embedding model may be trained using one or more words from one or more historic user queries. Each word in the user query may be referred as a target word. The word embedding feature may indicate semantic and syntactic significance of the word in the user query. Thereafter, the intent detection system 103 may identify Part of Speech (POS) tag feature such as noun, pronoun, verb, adverb and the like for each word in the user query. Once the word embedding and the POS features are identified, the system 103 may determine a dependency label feature for each word in the user query by using a dependency parse tree. The dependency parse tree is generated based on the dependency role of each word in the user query and POS tag feature of each word in the user query. Further, the system 103 may generate a feature vector for the user query comprising the POS tag feature of each target word, POS tag feature of previous two words of each target word in the user query, word embedding feature of each target word in the user query, word embedding feature of a head word for each of the target word and the dependency label feature of the target word. The head word for each of the target word is determined using the dependency label feature of each word in the user query. The feature vector generated for one or more target words in the user query is provided to a deep neural network. The deep neural network is trained using the feature vector associated with one or more historic user queries. Therefore, upon receiving the feature vector, the deep neural network may detect the intent as the ordered sequence. As an example, for the user query "Please cancel my flight ticket from Chennai to Kolkata", the ordered sequence may comprise the desired action which may be "cancel", the focal point which may be "flight ticket" and one or more descriptors may be "Chennai to Kolkata". In this manner, the present disclosure identifies true and complete intent from the user query, which is highly usable by the intelligent systems 107 for providing a correct and accurate response. The intelligent systems 107 may include, but not limited to, a chat bot, question answering systems, virtual assistance, crowdsourcing platforms and search engines.

Figure 2:
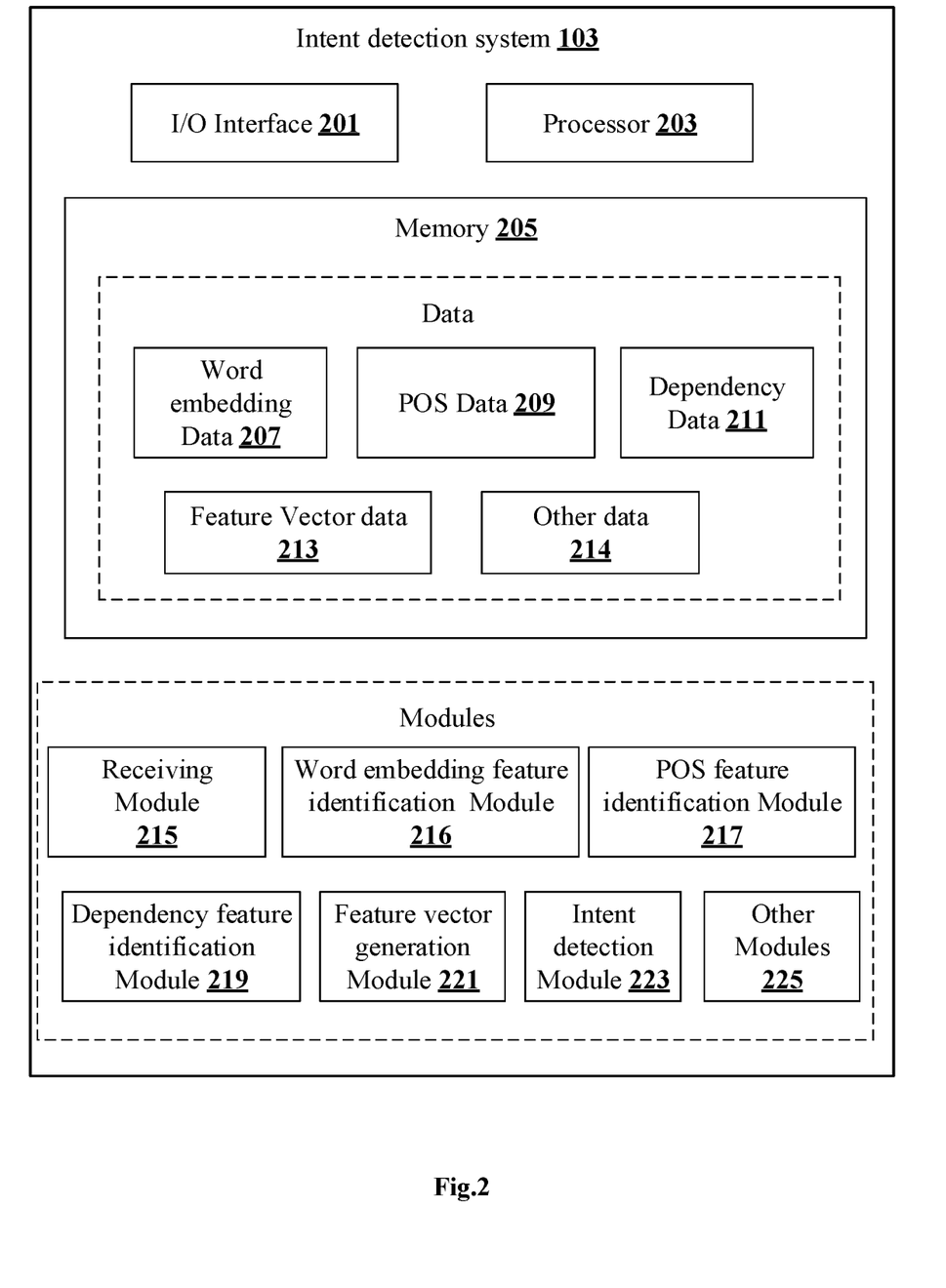
FIG. 2 shows a block diagram of an intent detection system in accordance with some embodiments of the present disclosure.

FIG. 2 shows a block diagram of an intent detection system in accordance with some embodiments of the present disclosure.

In some implementations, the system 103 may include I/O interface 201, a processor 203 and a memory 205. The I/O interface 201 may be configured to receive the user query or the utterance from a user 101. The processor 203 may be configured to receive the user query and process the user query to identify the intent as an ordered sequence. The system 103 may include data and modules. As an example, the data is stored in a memory 205 configured in the system 103 as shown in the FIG. 2. In one embodiment, the data may include word embedding data 207, POS data 209, dependency data 211, feature vector data 213 and other data 214. In the illustrated FIG. 2, modules are described herein in detail.

In some embodiments, the data may be stored in the memory 205 in the form of various data structures. Additionally, the data can be organized using data models, such as relational or hierarchical data models. The other data 214 may store data, including temporary data and temporary files, generated by the modules for performing the various functions of the system 103.

In some embodiments, the data stored in the memory 205 may be processed by the modules of the system 103. The modules may be stored within the memory. In an example, the modules communicatively coupled to the processor 203 configured in the system 103, may also be present outside the memory 205 as shown in FIG. 2 and implemented as hardware. As used herein, the term modules may refer to an Application Specific Integrated Circuit (ASIC), an electronic circuit, a processor (shared, dedicated, or group) and memory 205 that execute one or more software or firmware programs, a combinational logic circuit, and/or other suitable components that provide the described functionality.

In some embodiments, the modules may include, for example, a receiving module 215, a word embedding feature identification module 216, a POS feature identification module 217, a dependency feature identification module 219, a feature vector generation module 221, an intent detection module 223 and other modules 225. The other modules 225 may be used to perform various miscellaneous functionalities of the system 103. It will be appreciated that such aforementioned modules may be represented as a single module or a combination of different modules. Furthermore, a person of ordinary skill in the art will appreciate that in an implementation, the one or more modules may be stored in the memory, without limiting the scope of the disclosure. The said modules when configured with the functionality defined in the present disclosure will result in a novel hardware.

In an embodiment, the receiving module 215 may be configured to receive user query or an utterance from a user 101. As an example, the user 101 may provide the user query in an audio format. The receiving module 215 may convert the audio to text format.

In an embodiment, the word embedding feature identification module 216 may be configured to identify word embedding for each word in the user query. The word embedding identified may be stored as word embedding data 207. The word embedding feature identification module 216 may identify the word embedding based on a word embedding model. The word embedding model may be an artificial neural network model trained with semantic and syntactic significance of words in the context of user query. The word embedding model may be trained using one or more words from one or more historic user queries. As an example, the word 'begin' may be used to train the model and 'begin' may be detected as the desired action in the intent sequence. Now, if in real-time the user query comprises a new word 'commence', the intent sequence with 'commence' in the desired action may be generated as vector forms of the words or word vectors of 'begin' and 'commence' may have similar representations and will be closer in the vector space. Similarly, the words "home" and "abode" appear in similar contexts as their vectors will be similar, and the model will predict them correctly.

The word embeddings may be representations of a word in a low-dimensional vector space. The word embeddings map a word in raw text to a vector in a vector space with a pre-decided dimension. These vectors may be used to capture some notion of the syntactic and semantic features of a word in a context of the user query. As an example, algorithms such as 'word2vec', 'GloVe', and 'eLMO' may be used for determining the word embeddings.

In an embodiment, the POS feature identification module 217 may be configured to identify POS tag for each word in the user query. The POS feature indicates POS tag associated with a word in the user query such as noun, pronoun, verb, adverb and the like which is stored as POS data 209. In an embodiment, prior to identifying the POS tag, the user query or the sentence is processed by removing unnecessary tokens. The unnecessary tokens may include punctuations, white spaces, stop words and in some cases words with parts of speech that do not contribute towards the final task. In a way, noise in the sentence is filtered out, so that the features and parameters learnt by the deep neural network are as pure as possible.

As an example, the user query may be "Sachin Tendulkar used to play cricket for India". The POS tag for each word may be as indicated below.

"Sachin/NNP, Tendulkar/NNP, used/VB, to/TO, play/VB, cricket/NN, for/IN, India/NNP"

Wherein, VB=Verb, NNP=Noun (Proper), IN=Interjection, NN=Noun

In an embodiment, the dependency feature identification module 219 may be configured to identify dependency label feature for each word in the user query based on dependency role of each word in the user query and POS tag of each word in the user query. The dependency feature of each word may be stored as dependency data 211. The dependency feature identification module 219 may generate a dependency parse tree for the user query. From the generated dependency parse tree, the dependencies between the words may be extracted. As an example, the user query or a sentence may be "Sachin Tendulkar used to play cricket for India". The dependency feature identification module 219 may generate the dependency parse tree as shown below.

Dependency Parse Tree:
(ROOT
  (S
  (NP (NNP Sachin) (NNP Tendulkar))
  (VP (VBD used)
    (S
      (VP (TO to)
        (VP (VB play)
          (NP (NN cricket))
          (PP (IN for)
            (NP (NNP India)))))))

In an embodiment, based on the abovementioned dependency parse tree, the dependency feature identification module 219 may identify dependencies between the words as indicated below. The dependencies may be identified based on head word for each target word. As an example, the head word for the words "Sachin" and "Tendulkar" may be "used" as these words depend on the word "used". Similarly, the word "to" may also be dependent on word "used". Hence, the word "used" may be the head word.

In an embodiment, the feature vector generation module 221 may be configured to generate a feature vector. The feature vector may be generated based on POS tag feature of each target word, POS tag feature of previous two words of each target word in the user query, word embedding feature of each target word in the user query, word embedding feature of a head word for each of the target word and dependency label feature of the target word to a deep neural network. The POS tag feature of previous two words of each target word may be considered to determine correct meaning of the sentence. For each target word in the user query, a feature vector is determined based on the above-mentioned features in order to generate a feature vector for the user query. The feature vector may be stored as feature vector data 213. The POS tag of the target word may be represented as ($x_i$). The POS tag of previous two words of each target word may be represented as ($x_{i-2}$, $x_{i-1}$). The word embedding feature of each target word may be represented as ($W_i$). The word embedding feature of head word for each target word may be represented as ($W_h$). The dependency label feature of each target word may be represented as ($D_l$). The feature vector generated may be represented as given below.

Feature Vector=($x_{i-2}$, $x_{i-1}$, $x_i$, $W_i$, $W_h$, $D_l$)

In an embodiment, upon generating the feature vector, the feature vector may be provided to a deep neural network. The deep neural network may be trained using the feature vector associated with one or more historic user queries obtained from a knowledge database. The one or more historic queries may be retrieved from consumer websites, search engines, information retrieval systems, chat interfaces, user query logs and question answering system. To train the deep neural network, the data needs to be as varied as possible. This increases the coverage and variance of the data, reducing chances of coming across completely unseen pattern instances. In an embodiment, the deep neural network may consider POS tags, the dependency label feature and word embeddings of words as features. For each sentence or the historic user query, the model stores corresponding intent sequence respect to the focal point, desired action and descriptors. The deep neural network may be trained with sentences and its corresponding intent to differentiate user intent words from others and to understand their inter dependencies. In order to train the deep neural network, the user query or the sentence is manually mapped to the intent sequence. As an example, the user query may be "Chloe wants to know which restaurants are open in Bangalore after midnight". The Intent sequence may be "restaurants are open in Bangalore, wants to know, after midnight" wherein the focal point is "restaurants are open in Bangalore", desired action is "wants to know" and one or more descriptors may be "after midnight". Similarly, if the user query is "Which country did Sachin Tendulkar play cricket for" then the intent sequence may be "Sachin Tendulkar, play cricket, country". The deep neural network comprises an encoder-decoder network for providing the intent sequence for the feature vector associated with the user query. The feature vector generated from the user query are provided to the encoder decoder network for generating the intent as an ordered sequence using a softmax layer in the deep neural network. In an embodiment, the feature vector generated from the user query is provided to encoder of the deep neural network, which may be implemented as Bi-directional LS™ network. The encoder produces a sequence of hidden states. At each time stamp t, the feature vector of a previous word is provided to a decoder (unidirectional LS™), which provides the hidden state vector which helps in producing the output which is the intent in an ordered sequence, using a Softmax Layer of the deep neural network.

Thereafter, upon extracting the intent sequence from the input text sequence, the system also determines a manner in which the importance of each word can be emphasized. This is achieved using the attention mechanism, discussed in the subsequent sub-sections. The deep neural network may implement attention distribution mechanism to generate the intent as an ordered sequence upon applying predefined weights for each target word associated with the user query.

In an embodiment, the attention distribution mechanism uses sequence of encoder hidden states $h_i$ and Decoder hidden states $s_t$ using which the attention distribution is expressed below:

$$e_i^t = v^t \tanh(f_h h_i + f_s s_t + b_{atten})$$

$$a^t = \text{softmax}(e_i^t)$$

In an embodiment, the attention distribution is used to produce the weighted sum of the encoder network's hidden states which is referred as Vector $\overset{o}{h}_l$ $$\overset{o}{h}_l = \sum_i a_i^t h_i$$

Further, the final output of the neural network is calculated using a Softmax function, which is a generalized form of the logistic function. The Softmax function essentially computes a distribution among the resultant classes. The Softmax layer provides a probability distribution over each target word in the input text for generating the intent as an ordered sequence.

In an embodiment, the intent detection module 223 in association with a post processing module may be configured to detect intent as an ordered sequence based on the feature vector using the deep neural network. Upon receiving the feature vector, the deep neural network may detect the intent as the ordered sequence for the user query. The post processing module accepts the intent sequence generated by the deep neural network and from the sequence extracts the intent in a user 101 understandable format, contained in the underlying sentence. The post processing module makes sure that the output returned by the deep neural network is clean and comprehendible by the user 101 and can be interpreted both by a human as well as a Natural Language Understanding (NLU) engine.

The ordered sequence may include a desired action in the user query, a focal point pertaining to which the desired action has to be performed and one or more descriptors associated with the focal point in the user query. As an example, the user query or the sentence may be "Lionel Messi plays football for Football Club Barcelona". The intent sequence may be "Lionel Messi|plays football|Football Club Barcelona".

Wherein: the focal point is "Lionel Messi", the desired action is "plays football" and the one or more descriptors may be "Football Club Barcelona".

Further, upon identifying the intent as an ordered sequence, the intent may be provided to a cognitive system or an intelligent system 107 such as chat bots, search engines, dialogue-based systems or question answering systems for providing a suitable response to the user query based on the identified intent.

Figure 3:
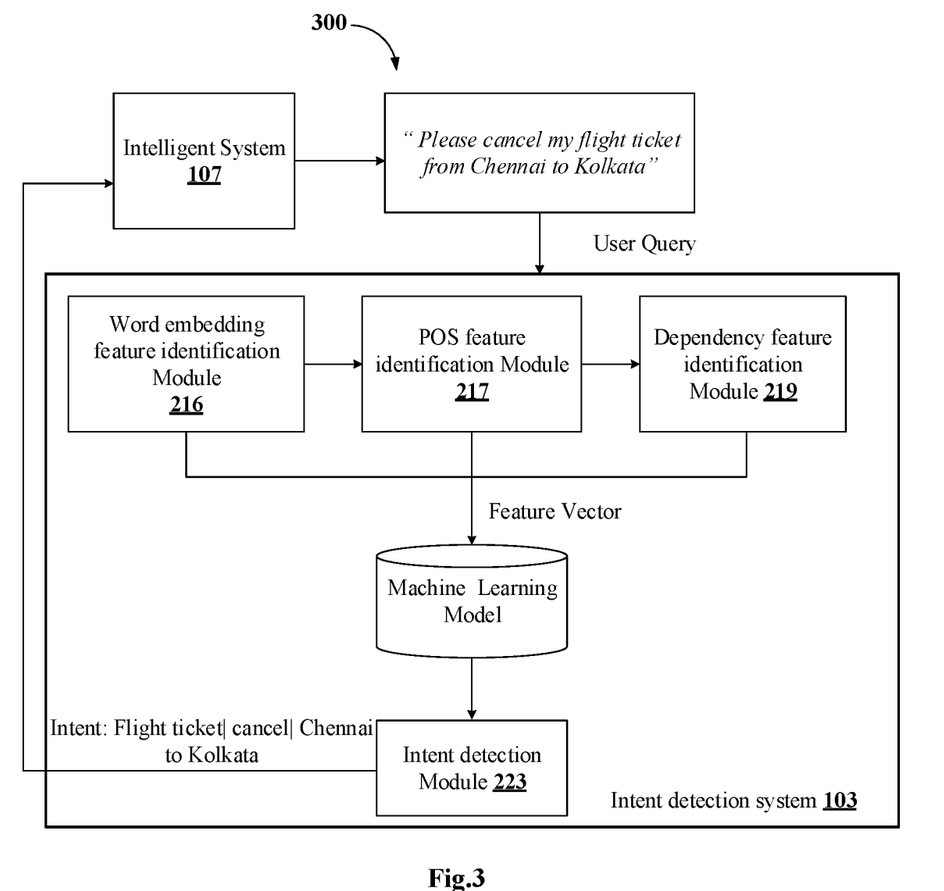
FIG. 3 illustrates an exemplary embodiment for detecting intent as an ordered sequence in accordance with some embodiments of the present disclosure.

FIG. 3 illustrates an exemplary embodiment for detecting intent as an ordered sequence in accordance with some embodiments of the present disclosure.

As shown in FIG. 3, the user 101 may provide a user query as "Please cancel my flight ticket from Chennai to Kolkata" to an intelligent system 107 such as a chat bot. Now, for the chat bot to provide response to the user query, the intent must be identified which is performed by the intent detection system 103. Therefore, the user query is provided to the intent detection system 103. At first the user query is provided to the word embedding feature identification module 216 to identify word embeddings for each word in the user query. Thereafter, the user query is provided to the POS feature identification module 217 which identifies POS tag for each word in the user query such as noun, pronoun, verb and adverb. Further, the POS tagged user query is provided to the dependency feature identification module 219 to identify the dependency of each role in the user query. Thereafter, feature vector is generated based on the POS tag feature of each target word, POS tag feature of previous two words of each target word in the user query, word embedding feature of each target word in the user query and word embedding feature of a head word for each of the target word in the user query based on the dependency role of each word identified from the dependency label feature. The generated feature vector is provided to the deep neural network. The intent detection module 223 using the deep neural network based on the feature vector detects the intent from the user query as an ordered sequence as shown below.

Focal point—"flight ticket"
Desired action—"cancel"
One or more descriptors—"Chennai to Kolkata".

The detected intent may be provided to the intelligent systems 107 for providing a suitable response.

Figure 4:
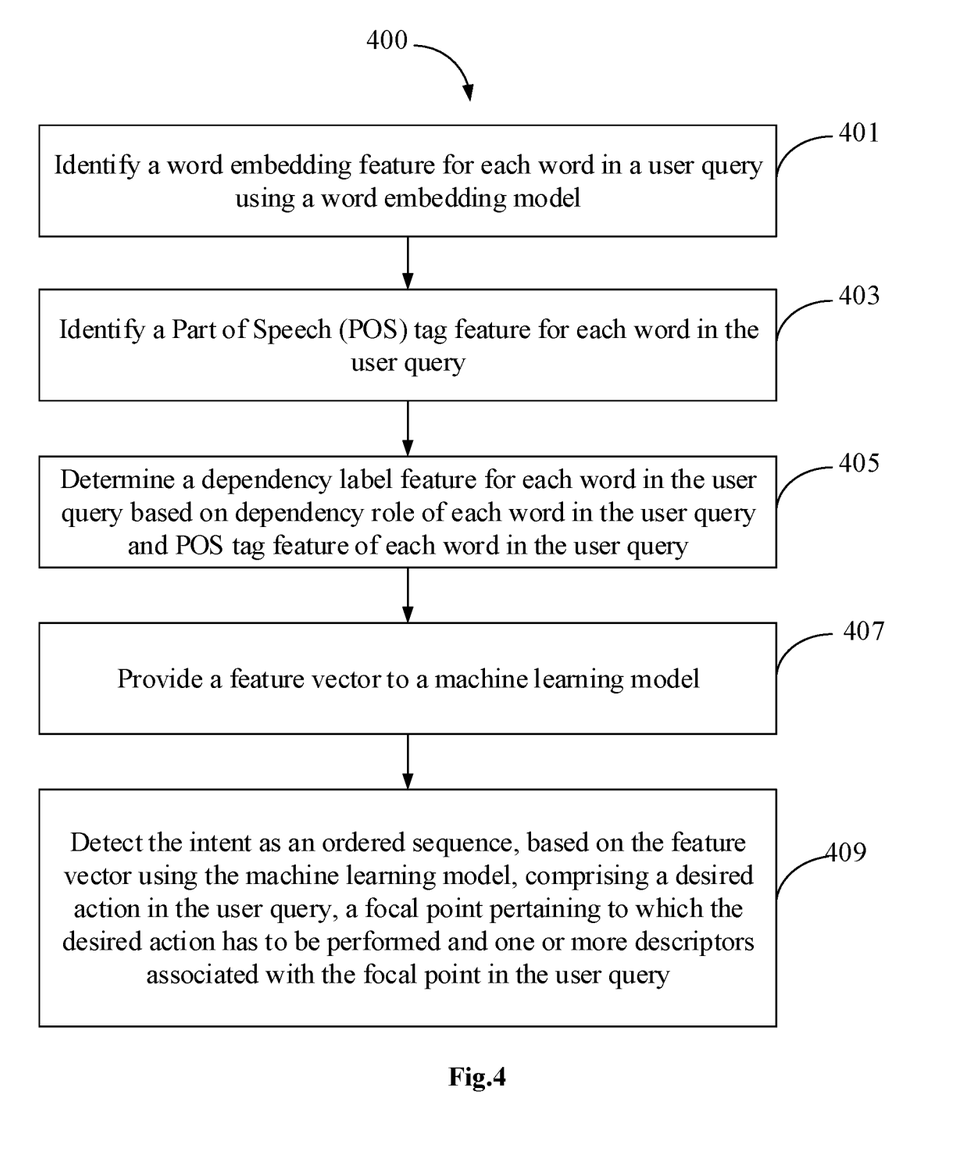
FIG. 4 shows a flowchart illustrating method for detecting intent as an ordered sequence from a user query in accordance with some embodiments of the present disclosure.

FIG. 4 shows a flowchart illustrating a method for detecting intent as an ordered sequence in accordance with some embodiments of the present disclosure.

As illustrated in FIG. 4, the method 400 includes one or more blocks illustrating a method of providing augmented reality information for an object. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the method may include identifying a word embedding feature for each word in a user query using a word embedding model. The word embedding model may be an artificial neural network model trained with semantic and syntactic significance of words in the context of user query. The word embedding model may be trained using one or more words from one or more historic user queries.

At block 403, the method may include identifying a Part of Speech (POS) tag feature for each word in the user query. The POS feature indicates POS tag associated with a word in the user query.

At block 405, the method may include determining a dependency label feature for each word in the user query based on dependency role of each word in the user query and POS tag feature of each word in the user query. The dependency feature identification module 219 may generate a dependency parse tree for the user query. From the dependency parse tree, the dependencies between the words may be extracted.

At block 407, the method may include providing a feature vector to a deep neural network. The feature vector may comprise the POS tag feature of each target word, POS tag feature of previous two words of each target word in the user query, word embedding feature of each target word in the user query, word embedding feature of a head word for each of the target word and dependency label feature of the target word to a deep neural network. The deep neural network may be trained using the feature vector associated with one or more historic user queries.

At block 409, the method may include detecting the intent as an ordered sequence based on the feature vector using the deep neural network. The intent may comprise the desired action in the user query, a focal point pertaining to which the desired action has to be performed and one or more descriptors associated with the focal point in the user query.

In an embodiment, upon identifying the intent, the identified intent may be provided to an intelligent system 107 such as chat bots, search engines, dialogue-based systems or question answering systems to provide a suitable response.

Computer System

Figure 5:
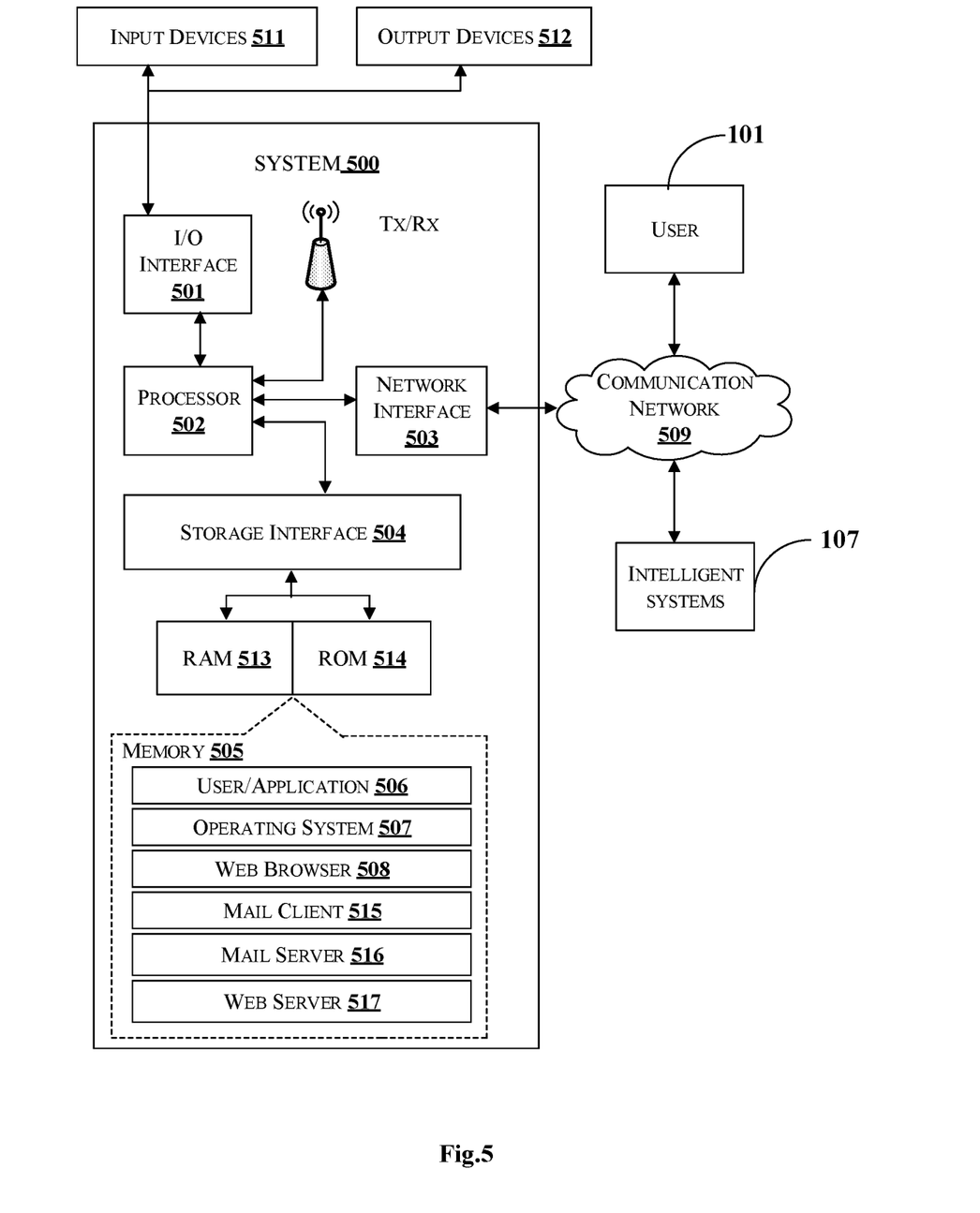
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be an intent detection system 103, which is used for detecting intent as an ordered sequence. The computer system 500 may include a central processing unit ("CPU" or "processor") 502. The processor 502 may comprise at least one data processor for executing program components for executing user or system-generated business processes. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512. The computer system 500 may receive user query from a user 101.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 509 can be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application 506, an operating system 507, a web browser 508, mail client 515, mail server 516, web server 517 and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT' WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure discloses a method and system for detecting an intent as an ordered sequence from a user query.

In an embodiment, the present disclosure identifies complete intent from the user query in terms desired action in the user query, a focal point pertaining to which the desired action has to be performed and one or more descriptors associated with the focal point and hence aids intelligent systems to accurately provide response to user query.

In an embodiment, in the present disclosure the context and content of user query is extracted accurately as all the parameters such as focal point, desired action and descriptors are considered.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 100 | Architecture |
| 101 | User |
| 103 | Intent detection system |
| 105 | Database |
| 107 | Intelligent systems |
| 201 | I/O Interface |
| 203 | Processor |
| 205 | Memory |
| 207 | Word embedding data |
| 209 | POS data |
| 211 | Dependency data |
| 213 | Feature vector data |
| 214 | Other data |
| 215 | Receiving module |
| 216 | Word embedding feature identification module |
| 217 | POS feature identification module |
| 219 | Dependency feature identification module |
| 221 | Feature vector generation module |
| 223 | Intent detection module |
| 225 | Other modules |
| 500 | Exemplary computer system |
| 501 | I/O Interface of the exemplary computer system |
| 502 | Processor of the exemplary computer system |
| 503 | Network interface |
| 504 | Storage interface |
| 505 | Memory of the exemplary computer system |
| 506 | User/Application |
| 507 | Operating system |
| 508 | Web browser |
| 509 | Communication network |
| 511 | Input devices |
| 512 | Output devices |
| 513 | RAM |
| 514 | ROM |
| 515 | Mail Client |
| 516 | Mail Server |
| 517 | Web Server |

What is claimed is:

1. A method for detecting intent as an ordered sequence from a user query, the method comprising:

identifying, by an intent determination system, a word embedding feature for each word in a user query using a word embedding model;

identifying, by the intent determination system, a Part of Speech (POS) tag feature for each word in the user query;

determining, by the intent determination system, a dependency label feature for each word in the user query based on dependency role of each word in the context of the user query and POS tag feature of each word in the user query;

providing, by the intent determination system, a feature vector for the user query comprising the POS tag feature of each target word, POS tag feature of previous two words of each target word in the user query, word embedding feature of each target word in the user query, word embedding feature of a head word for each of the target word in the user query and the dependency label feature of the target word to a deep neural network, wherein the head word for each of the target word is determined using the dependency label feature of each word in the user query; and detecting, by the intent determination system, the intent as an ordered sequence, based on the feature vector using a deep neural network, comprising a desired action in the user query, a focal point pertaining to which the desired action has to be performed and one or more descriptors associated with the focal point in the user query.

2. The method as claimed in claim 1, wherein the word embedding feature indicates semantic and syntactic significance of each word in the user query.

3. The method as claimed in claim 1, wherein the deep neural network is trained to generate the intent as an ordered sequence based on the feature vector associated with one or more historic user queries.

4. The method as claimed in claim 3, wherein the deep neural network comprises an encoder-decoder network for providing the intent as ordered sequence for the feature vector associated with the user query, wherein the deep neural network implements attention distribution mechanism to generate the intent as an ordered sequence upon applying predefined weights for each target word in the user query provided to the deep neural network.

5. The method as claimed in claim 1, wherein the word embedding model is trained using one or more words from one or more historic user queries.

6. An intent detection system for detecting intent as an ordered sequence from a user query, the intent detection system comprising:
   a processor; and
   a memory communicatively coupled to the processor, wherein the memory stores the processor-executable instructions, which, on execution, causes the processor to:
   identify a word embedding feature for each word in a user query using a word embedding model;
   identifying, by the intent determination system, a Part of Speech (POS) tag feature for each word in the user query;
   determine a dependency label feature for each word in the user query based on dependency role of each word in the context of the user query and POS tag feature of each word in the user query;
   provide a feature vector for the user query comprising the POS tag feature of each target word, POS tag feature of previous two words of each target word in the user query, word embedding feature of each target word in the user query, word embedding feature of a head word for each of the target word in the user query, and the dependency label feature of the target word to a deep neural network, wherein the head word for each of the target word is determined using the dependency label feature of each word in the user query; and
   detect the intent as an ordered sequence, based on the feature vector using a deep neural network, comprising a desired action in the user query, a focal point pertaining to which the desired action has to be performed and one or more descriptors associated with the focal point in the user query.

7. The intent detection system as claimed in claim 6, wherein the word embedding feature indicates semantic and syntactic significance of each word in the user query.

8. The intent detection system as claimed in claim 6, wherein the word embedding model is trained using one or more words from one or more historic user queries.

9. The intent detection system as claimed in claim 6, wherein the processor generates the intent as an ordered sequence using the deep neural network which is trained based on the feature vector associated with one or more historic user queries.

10. The intent detection system as claimed in claim 9, the deep neural network comprises an encoder-decoder network for providing the intent as an ordered sequence for the feature vector associated with the user query, wherein the deep neural network implements attention distribution mechanism to generate the intent as an ordered sequence upon applying predefined weights for each target word in the user query provided to the deep neural network.

11. A non-transitory computer readable medium including instructions stored thereon that when processed by at least one processor causes the processor to:
   identify a word embedding feature for each word in a user query using a word embedding model;
   identify a Part of Speech (POS) tag feature for each word in the user query;
   determine a dependency label feature for each word in the user query based on dependency role of each word in the context of the user query and POS tag feature of each word in the user query;
   provide a feature vector for the user query comprising the POS tag feature of each target word, POS tag feature of previous two words of each target word in the user query, word embedding feature of each target word in the user query, word embedding feature of a head word for each of the target word in the user query and the dependency label feature of the target word to a deep neural network, wherein the head word for each of the target word is determined using the dependency label feature of each word in the user query; and
   detect the intent as an ordered sequence, based on the feature vector using a deep neural network, comprising a desired action in the user query, a focal point pertaining to which the desired action has to be performed and one or more descriptors associated with the focal point in the user query.

12. The non-transitory computer readable medium as claimed in claim 11, wherein the word embedding feature indicates semantic and syntactic significance of each word in the user query.

13. The non-transitory computer readable medium as claimed in claim 11, wherein the word embedding model is trained using one or more words from one or more historic user queries.

14. The non-transitory computer readable medium as claimed in claim 11, wherein the instructions causes the processor to generate the intent as an ordered sequence using the deep neural network which is trained based on the feature vector associated with one or more historic user queries.

15. The non-transitory computer readable medium as claimed in claim 14, wherein the deep neural network comprises an encoder-decoder network for providing the intent as an ordered sequence for the feature vector associated with the user query, wherein the deep neural network implements attention distribution mechanism to generate the intent as an ordered sequence upon applying predefined weights for each target word in the user query provided to the deep neural network.

* * * * *